Patented Mar. 3, 1931

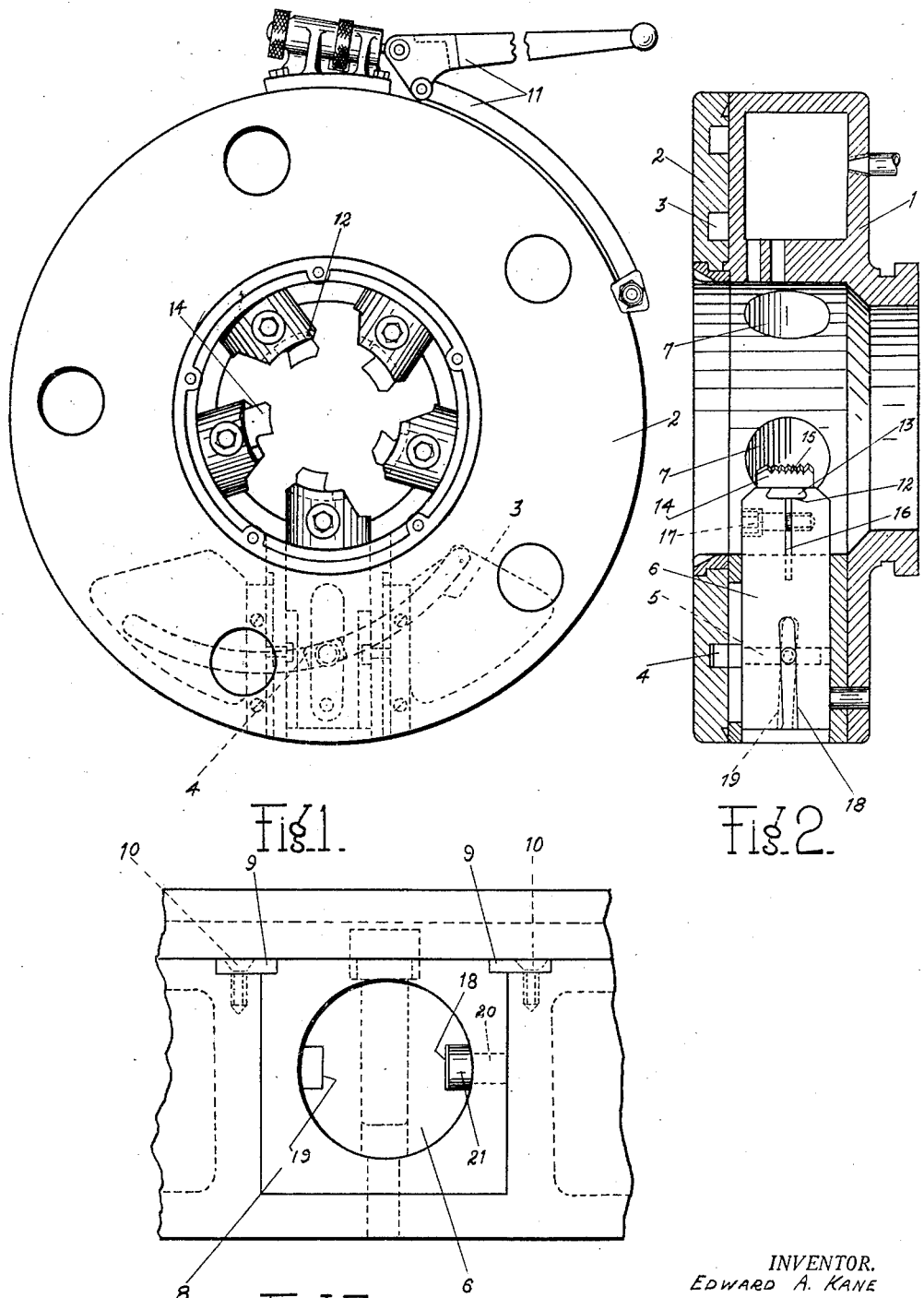

1,794,963

UNITED STATES PATENT OFFICE

EDWARD A. KANE, OF ERIE, PENNSYLVANIA, ASSIGNOR TO WILLIAMS TOOL CORPORATION, OF ERIE, PENNSYLVANIA

THREADING DIE AND HOLDER

Application filed May 28, 1929. Serial No. 366,608.

My invention relates to an improved threading die and holder and has for its primary object the provision of a novel radially adjustable die slidable in an arcuate seat whereby after grinding the die it may be properly adjusted to cutting position.

A further object of my invention is to provide a die holder which is automatically rotatably adjustable whereby upon adjustment of the holder longitudinally to the size pipe to be threaded, the die will be automatically adjusted to properly follow the helix of the size thread to be cut.

Still another and important object of my invention lies in the provision of a die holder which may be reversed in its seat or path and in such reversed position be properly arranged to cut "left hand" threads without the necessity of changing the die for straight or running threads, or putting a new set of holders in the head for cutting such left hand threads.

Other objects and advantages of my invention will be apparent as the description proceeds, reference now being had to the figures of the accompanying drawing forming a part of this application and wherein like reference numerals indicate like parts.

In the drawing:—

Figure 1 is a front view of a die head showing the relation of my improved dies and holders thereto.

Figure 2 is a cross sectional view of the head illustrating one of the die holders in position.

Figure 3 is a detail plan view of one of the holders.

The reference numeral 1 indicates the die head proper upon the front face of which is rotatably mounted the cam plate 2 provided with the cam grooves 3 within which are slidably mounted the shoes 4 carried by pins 5 mounted in the cylindrical die holders 6. The die holders 6 are slidably mounted within the radial openings 7 in blocks 8 secured in the die head 1 as by means of the clamping plates 9 and screws or other fastening means 10. Obviously, therefore, if the cam plate 2 is rotated, the die holder 6 will be radially adjusted inwardly and outwardly with respect to the center of the head where the cutting operation takes place. Any suitable adjusting means such as indicated generally at 11 in Figure 1 may be provided for rotating the cam plate 2.

As before stated, the die holder 6 is cylindrical in form and is provided at its inner end with an arcuate dove tail slot 12 adapted to receive the similarly shaped lug 13 on the back of the die or chaser bit 14 having the cutting teeth 15 on the front face thereof. The arc of the cutting face of the chaser bit 14 is the same as and concentric with the arc of the dove tail slot 12 in the holder. Obviously, therefore, if the chaser bit 14 is adjusted longitudinally within the slot 12 in the holder, as for instance would be necessary after grinding the die, such adjustment forward can be such as to bring the cutting edge of the die to exactly the same point as previously occupied with respect to the center of the work.

The die holder 6 is slit inwardly from the slot 12, as at 16, for a substantial distance, and at right angles to this slit 16 is provided a clamping screw 17 whereby when the die 15 is mounted in the holder and properly adjusted, the screw 17 may be tightened to securely clamp the die in such position.

The opposite end of the holder 6 is provided on opposite sides with elongated recesses 18 and 19 extending from the outer end of the die inwardly to a point adjacent the center of the die. The recess 18 is cut slightly diagonal with respect to the center line of the holder, as is also the recess 19, the latter diagonal however being in the opposite direction from that of the recess 18. This is shown clearly in Figure 2. Mounted on the block 8 through which the holder 6 is slidably adjustable, is a pin 20 carrying a roller 21 extending into the opening 7 and engaging within the slots 18 or 19 of the holder 6 depending upon which of said recesses is in position to receive it. It will be obvious, therefore, that upon the longitudinal adjustment of the holder 6, the engagement of the roller 21 within the diagonal slots 18 or 19 will cause a slight rotation of the die holder 6 within the block 8. The amount of this rotatable adjustment of the holder 6 is very slight and the illustration in Figure 2 of the slots 18 and 19 is greatly exaggerated for clearness of illustration. Such adjustment, however slight though it may be, is very effective in changing the position of the threading dies or chaser bits when moved into engagement for threading different sizes of pipe. The result of this slight adjustment is that the same set of dies may be used without replacing or changing to thread both large sized pipe and pipe of small diameter. The adjustment inwardly and outwardly of the die holders 6 to different size of pipe automatically adjusts the position of the dies to the proper helix for the threading operation. The slot 18 permits the adjustment when the dies are turned for "right hand" threads, and the slot 19 similarly provides for the "left hand" threads.

With the construction thus described, it will also be clear that the die holders 6 carrying the dies 14 may be withdrawn from the openings 7 and their positions reversed therein so as to bring the cutting edge of the dies to face in the opposite direction whereby "left hand" running or straight threads may be cut without the necessity of changing dies or holders or both.

Of course, changes may be made in details of construction and arrangement of parts without departing from the spirit and scope of my invention. I do not limit myself, therefore, to the exact structure herein shown and described other than by the appended claims.

I claim:

1. In combination with a die head having radially disposed openings therein, and cylindrical die holders slidably and rotatably adjustable in said openings, and means engaging said holders for automatically adjusting said holders rotatably upon sliding movement thereof, said means including pins extending into diagonal grooves in said holders.

2. In combination with a die head having radially disposed openings therein, cylindrical die holders slidable and rotatably adjustable in said openings, said holders being provided with diagonal grooves on opposite sides, said grooves extending in opposite directions, and stationary pins engaging in said grooves whereby sliding adjustment of said holders automatically rotatably adjusts them.

3. In combination with a die head having radially disposed openings therein, cylindrical die holders slidable and rotatably adjustable in said openings, said holders being provided with diagonal grooves on opposite sides, said grooves extending in opposite directions, and stationary pins engaging in said grooves whereby sliding adjustment of said holders automatically rotatably adjusts them, the engagement of said pins and grooves being interchangeable whereby the position of chaser bits carried by said holders may be reversed with respect to the work.

In testimony whereof, I affix my signature.

EDWARD A. KANE.